(12) United States Patent
Feng et al.

(10) Patent No.: US 11,671,985 B2
(45) Date of Patent: *Jun. 6, 2023

(54) DOWNLINK CONTROL INFORMATION TRANSMISSION METHOD AND APPARATUS

(71) Applicant: HUAWEI TECHNOLOGIES CO., LTD., Guangdong (CN)

(72) Inventors: Shulan Feng, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/387,175

(22) Filed: Jul. 28, 2021

(65) Prior Publication Data

US 2021/0360597 A1 Nov. 18, 2021

Related U.S. Application Data

(63) Continuation of application No. 16/537,207, filed on Aug. 9, 2019, now Pat. No. 11,115,969, which is a
(Continued)

(30) Foreign Application Priority Data

Feb. 10, 2017 (CN) .......................... 201710073164.0

(51) Int. Cl.
*H04W 72/04* (2023.01)
*H04W 72/23* (2023.01)
(Continued)

(52) U.S. Cl.
CPC .............. *H04W 72/23* (2023.01); *H04B 7/12* (2013.01); *H04W 72/0453* (2013.01)

(58) Field of Classification Search
None
See application file for complete search history.

(56) References Cited

U.S. PATENT DOCUMENTS

2011/0038303 A1  2/2011  Ji et al.
2013/0250880 A1*  9/2013  Liao ................ H04W 72/042
                                                          370/329
(Continued)

FOREIGN PATENT DOCUMENTS

CN      101765120      6/2010
CN      102395206      3/2012
(Continued)

OTHER PUBLICATIONS

3GPP TS 23.203 V14.2.0 (Dec. 2016), "3rd Generation Partnership Project; Technical Specification Group Services and System Aspects; Policy and charging control architecture (Release 14)," Dec. 2016, 256 pages.
(Continued)

*Primary Examiner* — Kodzovi Acolatse
(74) *Attorney, Agent, or Firm* — Fish & Richardson P.C.

(57) ABSTRACT

Embodiment of this application provide methods and apparatuses for communicating downlink control information. One method includes: dividing, by a terminal device, target resources into M resource subsets; determining, by the terminal device, a resource set from the M resource subsets, wherein the resource set consists of N control channel bearing resource units, N≥2, at least two of the N control channel bearing resource units belong to different resource subsets of the M resource subsets, and at least two of the N control channel bearing resource units are not consecutive in the frequency domain, wherein each of the N control channel bearing resource units includes at least two resource element groups (REGs) that are consecutive in the frequency domain, and wherein each REG of the at least two REGs
(Continued)

comprises a plurality of resource elements (REs); and receiving, by the terminal device, downlink control information on the resource set.

24 Claims, 11 Drawing Sheets

Related U.S. Application Data continuation of application No. PCT/CN2017/119812, filed on Dec. 29, 2017.

(51) Int. Cl.
*H04B 7/12* (2006.01)
*H04W 72/0453* (2023.01)

(56) References Cited

U.S. PATENT DOCUMENTS

| | | | |
|---|---|---|---|
| 2013/0336249 A1 | 12/2013 | Zhao et al. | |
| 2014/0198742 A1 | 7/2014 | Baldemair et al. | |
| 2014/0293946 A1* | 10/2014 | Suzuki | H04L 5/0053 370/329 |
| 2014/0355559 A1 | 12/2014 | Gao et al. | |
| 2015/0085772 A1* | 3/2015 | Seo | H04W 72/044 370/329 |
| 2015/0181577 A1* | 6/2015 | Moulsley | H04W 72/042 370/329 |
| 2016/0073408 A1 | 3/2016 | Sartori et al. | |
| 2016/0323859 A1 | 11/2016 | Liu et al. | |
| 2018/0167915 A1* | 6/2018 | Lee | H04W 12/108 |
| 2018/0227156 A1* | 8/2018 | Papasakellariou | H04W 72/042 |
| 2018/0262882 A1* | 9/2018 | You | H04W 72/005 |
| 2019/0014561 A1* | 1/2019 | Takeda | H04W 72/042 |
| 2019/0052332 A1* | 2/2019 | Shimezawa | H04W 72/0446 |

FOREIGN PATENT DOCUMENTS

| | | |
|---|---|---|
| CN | 102611524 | 7/2012 |
| CN | 102638892 | 8/2012 |
| CN | 103200684 | 7/2013 |
| CN | 103249087 | 8/2013 |
| CN | 103813460 | 5/2014 |
| CN | 105934917 | 5/2019 |
| EP | 2712254 | 3/2014 |
| JP | 2013236278 | 11/2013 |
| JP | 2015516130 | 6/2015 |

OTHER PUBLICATIONS

CATT "NR DL control channel structure," 3GPP TSG RAN WG1 Meeting #87, R1-1611390; Reno, USA, XP051175371, Nov. 14-18, 2016, 4 pages.
CATT, "RE mapping for E-CCE/E-REG," 3GPP TSG RAN WG1 Meeting 70bis, R1-124100; San Diego, USA, XP050662009, Oct. 8-12, 2012, 6 pages.
Extended European Search Report issued in European Application No. 17896278.3 dated Feb. 7, 2020, 14 pages.
Huawei et al.,"Search space design for ePDCCH", 3GPP TSG RAN WG1 Meeting #70, R1-123120, Qingdao, China, Aug. 13-17, 2012, total 6 pages.
Huawei et al., "Search space design for EPDCCH," 3GPP TSG RAN WG1 Meeting #70bis, R1-124078; San Diego, USA, XP050661988, Oct. 8-12, 2012, 8 pages.
Huawei, "Mapping of ECCE to EREG for localized and distributed transmission," 3GPP TSG RAN WG1 Meeting #70bis, R1-124076; San Diego, USA, XP050661986, Oct. 8-12, 2012, 6 pages.
LG Electronics,"Remaining details of ECCE and EREG resource mapping", 3GPP TSG RAN WG1 Meeting #70bis, R1-124320, San Diego, USA, Oct. 8-12, 2012, total 11 pages.
Nokia et al., "eREG / eCCE definitions for EPDCCH," 3GPP RAN WG1 Meeting #70-BIS, R1-124183, XP050662092, Oct. 8-12, 2012, 8 pages.
NTT DOCOMO Inc, "DL control channel design for NR,", 3GPP TSG RAN WG1 Meeting #87, R1-1612715; Reno, USA, XP051176658, Nov. 14-18, 2016, 5 pages.
NTT DOCOMO,"Remaining Issues Regarding ECCE/EREG-to-RE Mapping for EPDCCH",3GPP TSG RAN WG1 Meeting #71, R1-124840, New Orleans, USA, Nov. 12-16, 2012, total 3 pages.
PCT International Search Report and Written Opinion issued in International Application No. PCT/CN2017/119812 dated Mar. 27, 2018, 13 pages (with English translation).
R1-1609128—Samsung, "DL Control Channel Design," 3GPP TSG RAN WG1 #86bis, Lisbon, Portugal, Oct. 10-14, 2016, 3 pages.
R1-1609539—Intel Corporation, "On NR physical downlink control channel," 3GPP TSG-RAN WG1 #86-bis, Lisbon, Portugal, Oct. 10-14, 2016, 3 pages.
EP Extended European Search Report issued in European Application No. 22167065.6 dated Oct. 25, 2022, 12 pages.
Nokia, Nokia Siemens Networks, 3GPP TSG RAN WG1 Meeting #70bis, R1-124183, San Diego, USA, Oct. 8-12, 2012, 8 pages.
NTT DOCOMO, Inc., "DL Control Channel Design for NR," 3GPP TSG RAN WG1 Meeting #87, R1-1612715, Reno, USA, Nov. 14-18, 2016, 5 pages.

* cited by examiner

DOWNLINK CONTROL INFORMATION TRANSMISSION METHOD AND APPARATUS

CROSS-REFERENCE TO RELATED DISCLOSURES

This application is a continuation of U.S. patent application Ser. No. 16/537,207, filed on Aug. 9, 2019, which is a continuation of International Application No. PCT/CN2017/119812, filed on Dec. 29, 2017. The International Application claims priority to Chinese Patent Application No. 201710073164.0, filed on Feb. 10, 2017. All of the aforementioned patent applications are hereby incorporated by reference in their entireties.

TECHNICAL FIELD

Embodiments of the present disclosure relates to the communications field, and more specifically, to a downlink control information transmission method and apparatus.

BACKGROUND

In wireless communication, a network device needs to send downlink control information (DCI) to a terminal device.

In the prior art, when the network device sends the downlink control information to the terminal device, time-frequency resources that carry the downlink control information are distributed consecutively in frequency domain. That is, subcarriers that carry the downlink control information are consecutive.

Therefore, when the network device sends the downlink control information to the terminal device on the time-frequency resources consecutively distributed in frequency domain, a frequency diversity gain cannot be ensured because the subcarriers that carry the downlink control information are consecutive.

SUMMARY

This disclosure provides a downlink control information transmission method and apparatus, so as to increase a frequency diversity gain of downlink control information transmission.

According to a first aspect, a downlink control information transmission method is provided. The method includes: dividing target resources into M resource subsets, where at least a part of at least two resource subsets in the M resource subsets do not overlap in frequency domain, and each resource subset includes at least one control channel bearing resource unit, where M is an integer, and M≥2; determining a first resource set based on the M resource subsets, where the first resource set includes N control channel bearing resource units, at least two of the N control channel bearing resource units belong to different resource subsets, and at least two of the N control channel bearing resource units are inconsecutive in frequency domain, where N≥2; and sending first downlink control information to a terminal device on the first resource set.

Optionally, at least a part of any two resource subsets in the M resource subsets do not overlap in frequency domain.

Optionally, any two of the N control channel bearing resource units belong to different resource subsets.

The target resources are divided into the M resource subsets, at least a part of the M resource subsets do not overlap in frequency domain, one control channel bearing resource unit is selected from each of the M resource subsets to finally obtain the N control channel bearing resource units, and the N control channel bearing resource units are separated from each other at sufficient intervals (namely, inconsecutive) in frequency domain. Therefore, when the first downlink control information is sent to the terminal device by using the N control channel bearing resource units, a frequency diversity gain can be ensured.

With reference to the first aspect, in a first implementation of the first aspect, the method further includes: determining a mapping relationship, where the mapping relationship indicates a correspondence between at least one piece of downlink control information including the first downlink control information and at least one resource set including the first resource set; and the determining a first resource set based on the M resource subsets includes: determining, according to the mapping relationship, a resource set corresponding to the first downlink control information as the first resource set.

The mapping relationship is determined, and the resource set corresponding to the first downlink control information is determined according to the mapping relationship as the first resource set that carries the first downlink control information, so that a network device can more rapidly determine a resource that carries the downlink control information.

With reference to the first aspect and the foregoing implementation, in a second implementation of the first aspect, the target resources are divided into a plurality of frequency domain elements in frequency domain, and one control channel bearing resource unit includes at least two consecutive frequency domain elements.

The target resources are divided into at least one frequency domain element in frequency domain, and at least one of the N control channel bearing resource units is enabled to include at least two consecutive frequency domain elements, so that a terminal device that receives the downlink control information can demodulate the downlink control information by using a reference signal of the terminal device itself instead of sharing a reference signal with another terminal device in a same cell, thereby improving system spectral efficiency.

With reference to the first aspect and the foregoing implementations, in a third implementation of the first aspect, the target resources are divided into at least one time domain element in time domain, and one control channel bearing resource unit includes part of or all of the at least one time domain element.

With reference to the first aspect and the foregoing implementations, in a fourth implementation of the first aspect, a frequency domain bandwidth occupied by the M resource subsets is less than or equal to a bandwidth of the target resources.

The frequency domain bandwidth occupied by the M resource subsets is enabled to be less than or equal to the bandwidth of the target resources, so that the terminal device can use a narrower frequency domain bandwidth to receive the downlink control information, thereby reducing power consumption of the terminal device.

According to a second aspect, a downlink control information transmission method is provided. The method includes: determining a first resource set based on M resource subsets, where the first resource set includes N control channel bearing resource units, M is an integer, M≥2, at least two of the N control channel bearing resource units belong to different resource subsets, and at least two of the N control channel bearing resource units are inconsecutive in frequency domain, where N≥2; and receiving first downlink control information sent by a network device on the first resource set.

Optionally, at least a part of any two of the M resource subsets do not overlap in frequency domain.

Optionally, any two of the N control channel bearing resource units belong to different resource subsets.

Target resources are divided into the M resource subsets, at least a part of the M resource subsets do not overlap in frequency domain, one control channel bearing resource unit is selected from each of the M resource subsets to finally obtain the N control channel bearing resource units, and the N control channel bearing resource units are separated from each other at sufficient intervals (namely, inconsecutive) in frequency domain. Therefore, when the first downlink control information is sent to a terminal device by using the N control channel bearing resource units, a frequency diversity gain can be ensured.

With reference to the second aspect, in a first implementation of the second aspect, the method further includes: determining a mapping relationship, where the mapping relationship indicates a correspondence between at least one piece of downlink control information including the first downlink control information and at least one resource set including the first resource set; and the determining a first resource set based on M resource subsets includes: determining, according to the mapping relationship, a resource set corresponding to the first downlink control information as the first resource set.

The mapping relationship is determined, and the resource set corresponding to the first downlink control information is determined according to the mapping relationship as the first resource set that carries the first downlink control information, so that the terminal device can more rapidly determine a resource for receiving the downlink control information, thereby improving accuracy of receiving the downlink control information by the terminal device.

With reference to the second aspect and the foregoing implementation, in a second implementation of the second aspect, the target resources are divided into a plurality of frequency domain elements in frequency domain, and one control channel bearing resource unit includes at least two consecutive frequency domain elements.

The target resources are divided into at least one frequency domain element in frequency domain, and at least one of the N control channel bearing resource units is enabled to include at least two consecutive frequency domain elements, so that a terminal device that receives the downlink control information can demodulate the downlink control information, by using a reference signal of the terminal device itself instead of sharing a reference signal with another terminal device in a same cell, thereby improving system spectral efficiency.

With reference to the second aspect and the foregoing implementations, in a third implementation of the second aspect, the target resources are divided into at least one time domain element in time domain, and one control channel bearing resource unit includes part of or all of the at least one time domain element.

With reference to the second aspect and the foregoing implementations, in a fourth implementation of the second aspect, a frequency domain bandwidth occupied by the M resource subsets is less than or equal to a bandwidth of the target resources.

The frequency domain bandwidth occupied by the M resource subsets is enabled to be less than or equal to the bandwidth of the target resources, so that the terminal device can use a narrower frequency domain bandwidth to receive the downlink control information, thereby reducing power consumption of the terminal device.

According to a third aspect, a downlink control information transmission apparatus is provided, including units configured to perform the steps of the downlink control information transmission method according to the first aspect and the implementations of the first aspect.

According to a fourth aspect, a downlink control information transmission apparatus is provided, including units configured to perform the steps of the downlink control information transmission method according to the second aspect and the implementations of the second aspect.

According to a fifth aspect, a downlink control information transmission device is provided, including a memory and a processor. The memory is configured to store a computer program, and the processor is configured to invoke and run the computer program in the memory, so that a terminal device performs any downlink control information transmission method according to the first aspect and the implementations of the first aspect.

According to a sixth aspect, a downlink control information transmission device is provided, including a memory and a processor. The memory is configured to store a computer program, and the processor is configured to invoke and run the computer program in the memory, so that a network device performs any downlink control information transmission method according to the second aspect and the implementations of the second aspect.

According to a seventh aspect, a computer program product is provided, where the computer program product includes computer program code. When the computer program code is run by a processing unit and a sending unit, or a processor and a transmitter of a network device, a terminal device is enabled to perform any downlink control information transmission method according to the first aspect and the implementations of the first aspect.

According to an eighth aspect, a computer program product is provided, where the computer program product includes computer program code. When the computer program code is run by a receiving unit and a processing unit, or by a receiver and a processor of a terminal device, a network device is enabled to perform any downlink control information transmission method according to the second aspect and the implementations of the second aspect.

According to a ninth aspect, a computer readable storage medium is provided. The computer readable storage medium stores a program, and the program enables a terminal device to perform any downlink control information transmission method according to the first aspect and the implementations of the first aspect.

According to a tenth aspect, a computer readable storage medium is provided. The computer readable storage medium stores a program, and the program enables a network device to perform any downlink control information transmission method according to the second aspect and the implementations of the second aspect.

DESCRIPTION OF EMBODIMENTS

The following describes technical solutions of this disclosure with reference to accompanying drawings.

The technical solutions of the embodiments of this disclosure may be applied to various communications systems, such as a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), universal mobile telecommunications system (UMTS), a worldwide interoperability for microwave access (WiMAX) communications system, a future 5th generation (5G) system, or new radio (NR).

A terminal device in the embodiments of this disclosure may also be referred to as user equipment, an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or a terminal device in a future evolved public land mobile network (PLMN). This is not limited in the embodiments of this disclosure.

A network device in the embodiments of this disclosure may be a device configured to communicate with a terminal device. The network device may be a base transceiver station (BTS) in a global system for mobile communications (GSM) or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay node, an access point, an in-vehicle device, a wearable device, or a network device in a future 5G network, or a network device in a future evolved PLMN network. This is not limited in the embodiments of this disclosure.

Figure 1:
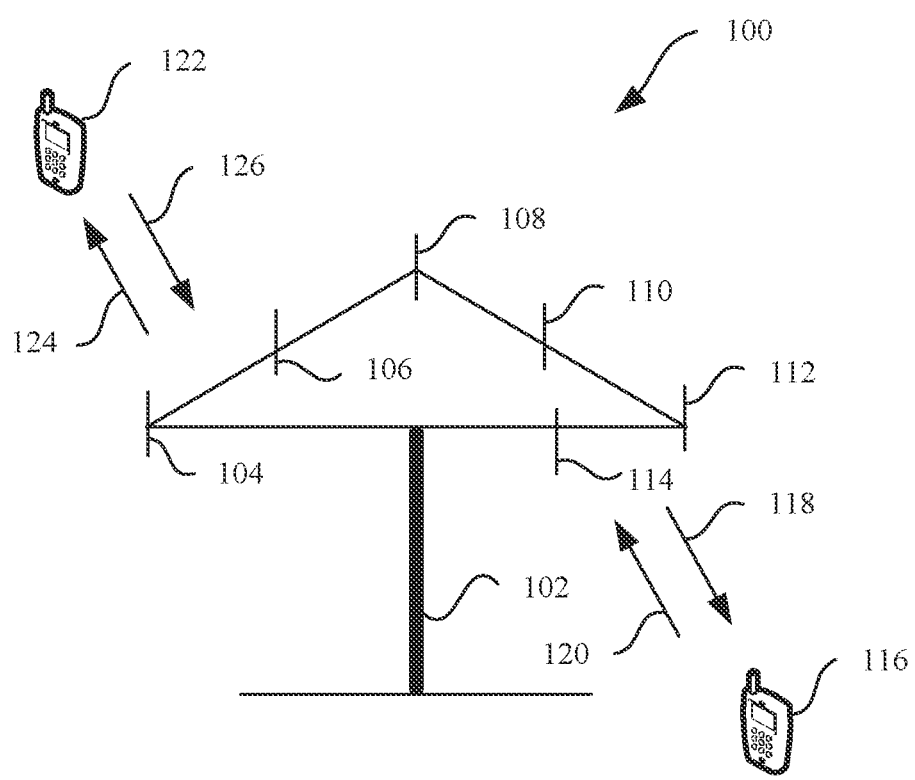
FIG. 1 is a schematic architectural diagram of a communications system according to this disclosure.

FIG. 1 is a schematic diagram of a communications system applicable to a downlink control signal transmission method and apparatus according to this disclosure. As shown in FIG. 1, a communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, an encoder, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other suitable device used for communication on the wireless communications system 100.

As shown in FIG. 1, the terminal device 116 communicates with the antennas 112 and 114, where the antennas 112 and 114 send information to the terminal device 116 through a forward link 118, and receive information from the terminal device 116 through a reverse link 120. In addition, the terminal device 122 communicates with the antennas 104 and 106, where the antennas 104 and 106 send information to the terminal device 122 through a forward link 124, and receive information from the terminal device 122 through a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may share a same frequency band, and the forward link 124 and the reverse link 126 may share a same frequency band.

Each antenna (or an antenna group consisting of a plurality of antennas) and/or an area designed for communication is referred to as a sector of the network device 102. For example, an antenna group may be designed to communicate with a terminal device in a sector within coverage of the network device 102. When the network device 102 communicates with the terminal devices 116 and 122 respectively through the forward links 118 and 124, transmit antennas of the network device 102 may increase signal-to-noise ratios of the forward links 118 and 124 by using beamforming. In addition, compared with a manner in which a network device sends signals to all terminal devices by using a single antenna, when the network device 102 uses beamforming to send signals to the terminal devices 116 and 122 that are randomly distributed in related coverage, a mobile device in a neighboring cell is less interfered.

Within a given time, the network device 102, the terminal device 116 or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus via a channel. The data bits may be included in a data transport block (or a plurality of transport blocks), and the transport block may be segmented to generate a plurality of code blocks.

In addition, the communications system 100 may be a PLMN network, a D2D network, an M2M network, or another network. FIG. 1 is merely an example simplified schematic diagram, and the network may further include another network device that is not shown in FIG. 1.

It should be noted that in this disclosure, a sending device may be the network device 102, or may be a terminal device (for example, the terminal device 116 or the terminal device 122). Correspondingly, a receiving device may be a terminal device (for example, the terminal device 116 or the terminal device 122), or may be the network device 102. This is not specially limited in this disclosure.

Figure 2:
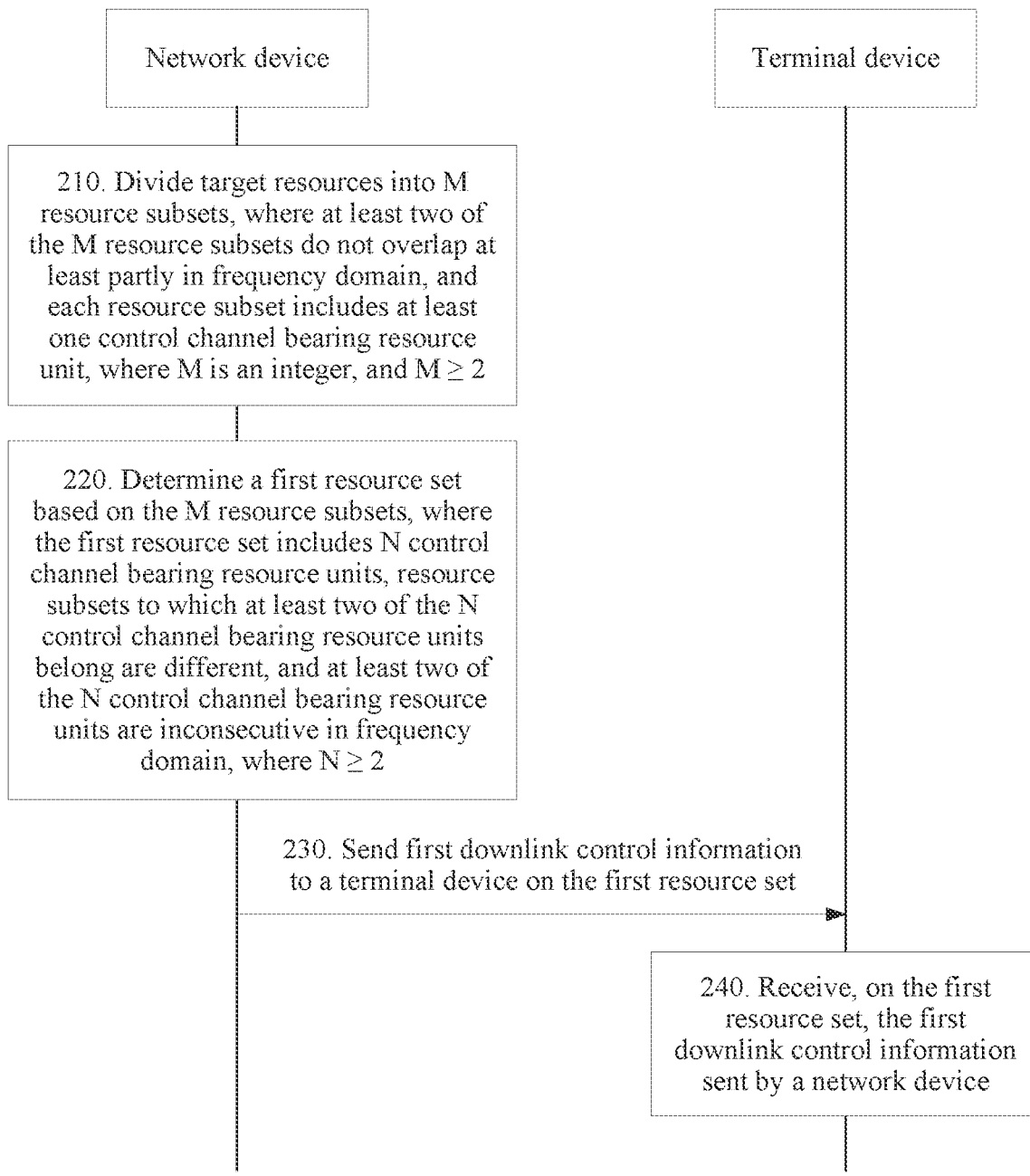
FIG. 2 is a schematic interaction diagram of a downlink control information transmission method according to this disclosure.

FIG. 2 illustrates a schematic flowchart of a downlink control information transmission method according to this disclosure. A terminal device in FIG. 2 may be the terminal device 116 or the terminal device 122 in FIG. 1, and a network device may be the network device 102 in FIG. 1. Certainly, in an actual system, a quantity of network devices and a quantity of terminal devices may be not limited to an example in this embodiment or another embodiment. Details are not described below again. As shown in FIG. 2, the method may include the following steps.

S210. Divide target resources into M resource subsets, where at least a part of at least two resource subsets in the M resource subsets do not overlap in frequency domain, and each resource subset includes at least one control channel bearing resource unit, where M is an integer, and M≥2.

S220. Determine a first resource set based on the M resource subsets, where the first resource set includes N control channel bearing resource units, at least two of the N control channel bearing resource units belong to different resource subsets, and at least two of the N control channel bearing resource units are inconsecutive in frequency domain, where N≥2.

Optionally, the target resources are divided into a plurality of frequency domain elements in frequency domain, and one control channel bearing resource unit includes at least two consecutive frequency domain elements.

Specifically, the network device divides the target resources into the M resource subsets. The target resources may be consecutive resources in frequency domain, and each of the M resource subsets includes at least one control channel bearing resource unit. Each control channel bearing resource unit includes n frequency domain elements, and each frequency domain element may be one resource element (RE) in frequency domain, or may be one resource element group (REG) in frequency domain, where one resource element group includes a plurality of resource elements REs, or each frequency domain element may be several consecutive control channel elements (CCEs) in frequency domain, where one control channel element includes a plurality of resource element groups (REGs). This is not limited in this disclosure.

Figure 3:
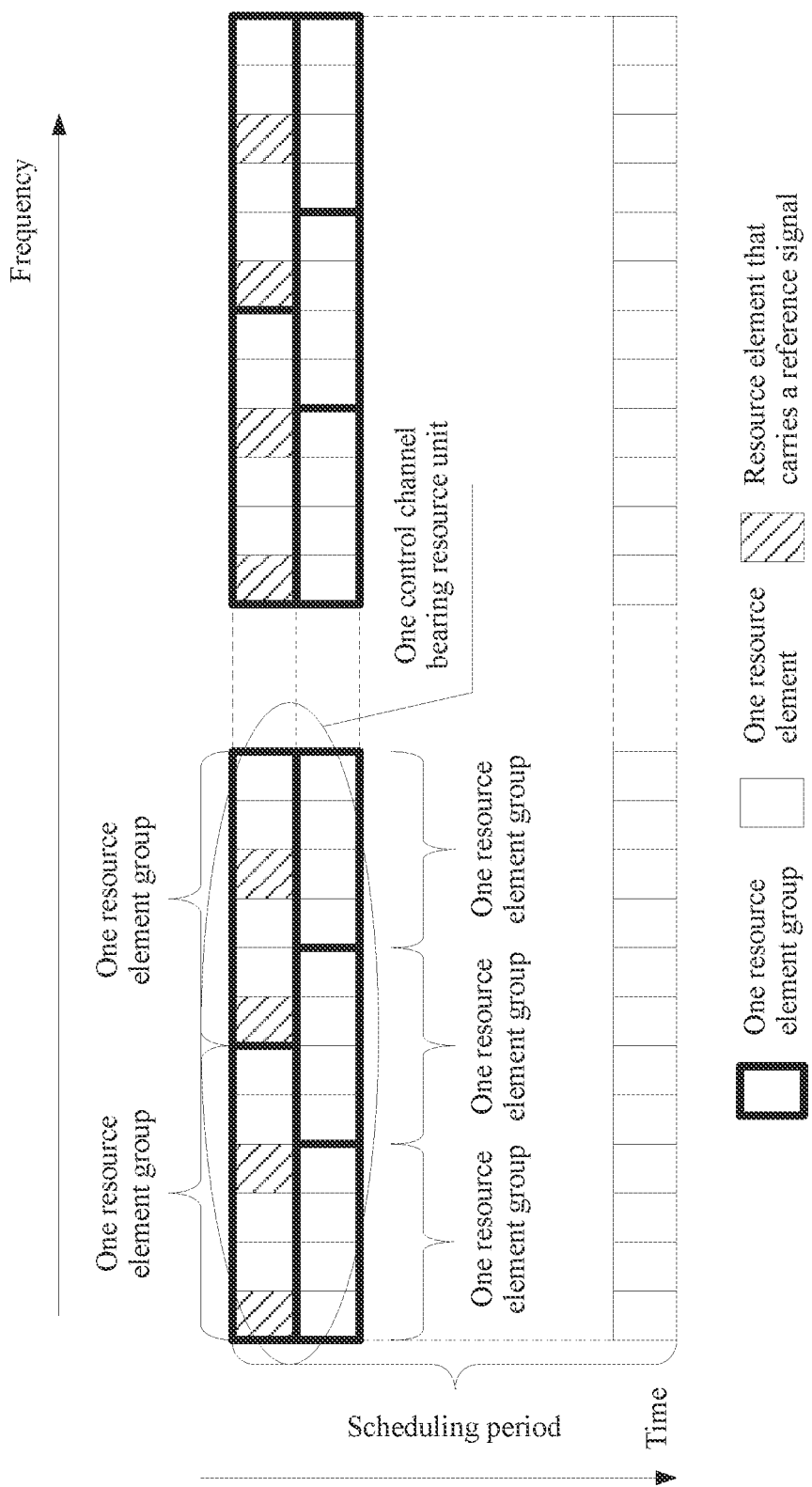
FIG. 3 is a schematic structural diagram of resource composition of a control channel bearing resource unit according to this disclosure.

FIG. 3 shows that one control channel bearing resource unit includes five consecutive resource element groups in frequency domain, and each resource element group includes four or six resource elements. It can be learned from FIG. 3 that in a resource group that includes six resource elements, two of the resource elements are used to carry reference signals.

When sending downlink control information to the terminal device, the network device determines a control channel bearing resource unit in the M resource subsets to finally form a resource set. A resource set that carries first downlink control information is the first resource set, and the first resource set includes N control channel bearing resource units, where N≥2. That is, the first resource set includes at least two control channel bearing resource units. At least two of the N control channel bearing resource units belong to different resource subsets. That is, one of the M resource subsets includes one of the N control channel bearing resource units, and finally the network device sends the first downlink control information to the terminal device by using the N control channel bearing resource units.

For example, the network device divides the target resources into eight resource subsets. When sending the downlink control information to the terminal device, the network device may determine one control channel bearing resource unit from each of the eight resource subsets. That is, the network device finally carries, by using the eight control channel bearing resource units, the downlink control information sent to the terminal device.

For another example, the network device may determine one control channel bearing resource unit from six of the eight resource subsets. That is, the network device finally carries, by using the six control channel bearing resource units, the downlink control information sent to the terminal device.

For still another example, the network device divides the target resources into two resource subsets. When sending the downlink control information to the terminal device, the network device may determine four control channel bearing resource units from each of the two resource subsets. That is, the network device finally carries, by using eight control channel bearing resource units, the downlink control information sent to the terminal device.

Comprehensively, the network device may determine one control channel bearing resource unit from each of the M resource subsets, or may determine a quantity of control channel bearing resource units less than M from some of the M resource subsets, or may determine a quantity of control channel bearing resource units greater than M from some of the M resource subsets. This is not limited in this disclosure.

Figure 4:
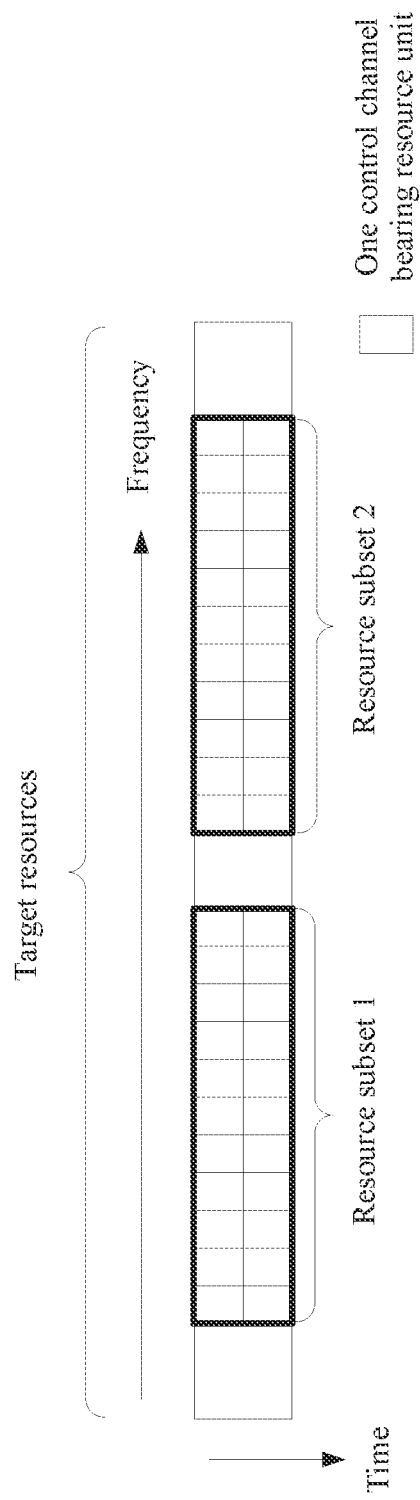
FIG. 4 is a schematic diagram of a resource subset distribution status according to this disclosure.

At least a part of at least two resource subsets in the M resource subsets do not overlap in frequency domain. For example, as shown in FIG. 4, that two resource subsets are included is used as an example to describe a distribution status of the M resource subsets in frequency domain. It may be learned that there is an interval between a resource subset 1 and a resource subset 2, that is, the resource subset 1 and the resource subset 2 are inconsecutive in frequency domain.

Figure 5:
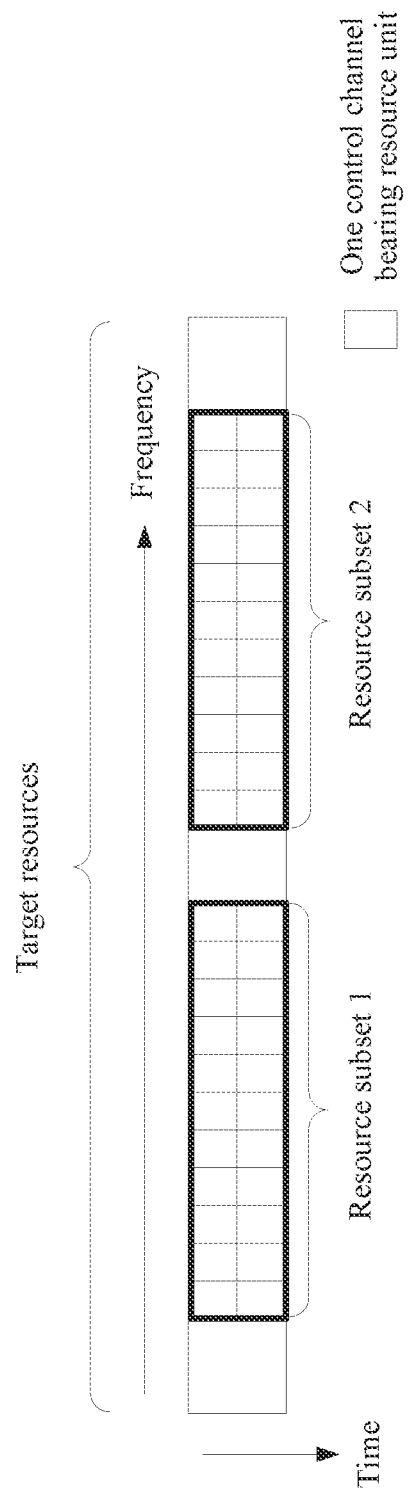
FIG. 5 is another schematic diagram of a resource subset distribution status according to this disclosure.
Figure 6:
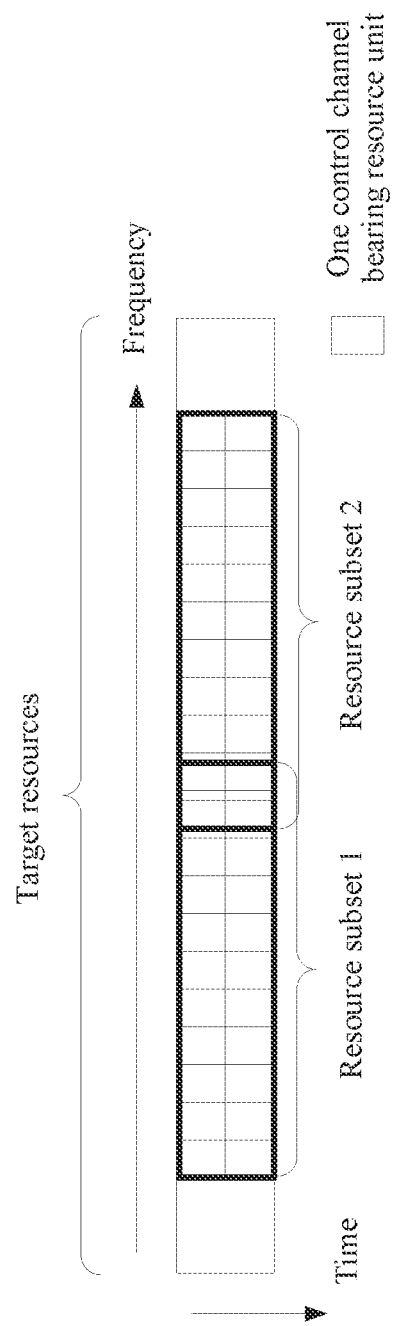
FIG. 6 is still another schematic diagram of a resource subset distribution status according to this disclosure.

For another example, as shown in FIG. 5, a resource subset 1 and a resource subset 2 may be consecutive, but there is no overlapping area between them. For still another example, as shown in FIG. 6, there may be a partly overlapping area between a resource subset 1 and a resource subset 2, but the resource subset 1 and the resource subset 2 cannot completely overlap each other.

It should be understood that this disclosure merely uses the foregoing several resource subset distribution manners for example, but this disclosure is not limited thereto. Resource subsets may alternatively be distributed in another manner.

At least two of the N control channel bearing resource units that are used to carry the downlink control information are inconsecutive in frequency domain. That is, when the N control channel bearing resource units that carry the downlink control information are determined in the M resource subsets, it needs to be ensured that at least two of the N control channel bearing resource units are inconsecutive in frequency domain.

Figure 7:
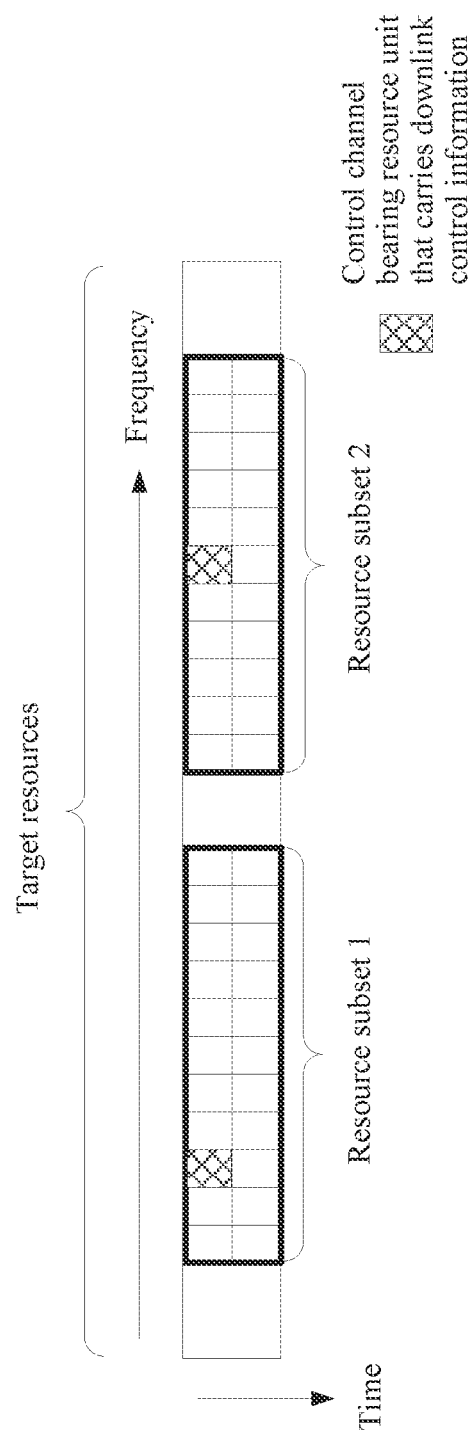
FIG. 7 is a schematic diagram of a distribution status of control channel bearing resource units that carry downlink control information according to this disclosure.

For example, as shown in FIG. 7, it may be learned that a resource subset 1 and a resource subset 2 are inconsecutive in frequency domain. That is, at least one control channel bearing resource unit in the resource subset 1 and at least one control channel bearing resource unit in the resource subset 2 are inconsecutive in frequency domain. Then, in the resource subset 1 and the resource subset 2, at least one control channel bearing resource unit in the resource subset 1 and at least one control channel bearing resource unit in the resource subset 2 may be separately determined as resources that carry the downlink control information, thereby ensuring that the control channel bearing resource units that carry the downlink control information are inconsecutive in frequency domain.

The target resources are divided into at least one frequency domain element in frequency domain, and each control channel bearing resource unit includes at least two consecutive frequency domain elements. Therefore, a terminal device that receives the downlink control information may demodulate the downlink control information by using a reference signal of the terminal device itself instead of sharing a reference signal with another terminal device in a same cell, thereby improving system spectral efficiency. Each frequency domain element may be one resource element (RE) in frequency domain, or may be one resource element group (REG) in frequency domain, or may be several control channel elements (CCEs) consecutive in frequency domain. This is not limited in this disclosure.

Figure 8:
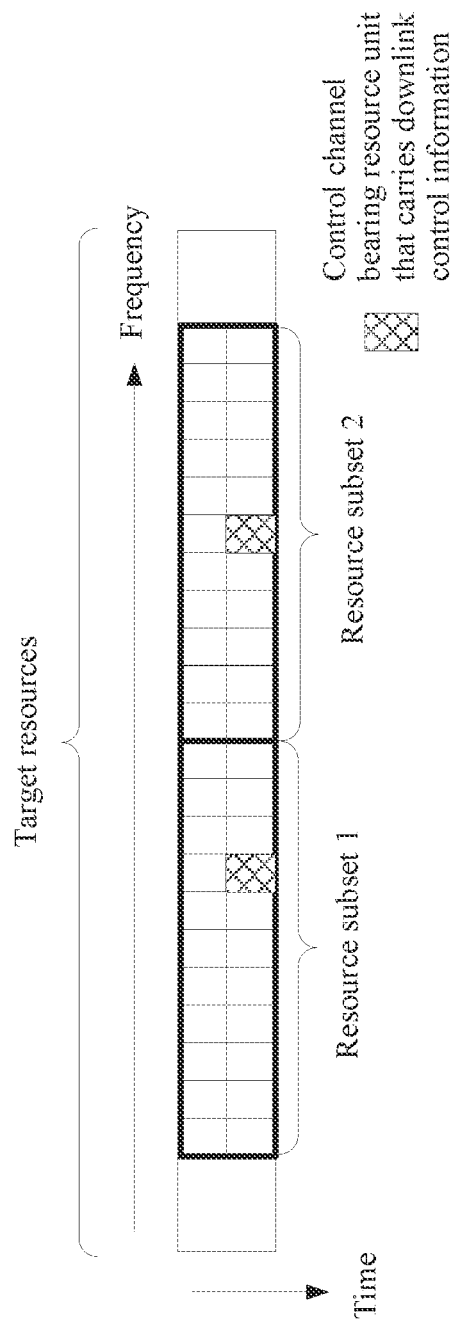
FIG. 8 is another schematic diagram of a distribution status of control channel bearing resource units that carry downlink control information according to this disclosure.

For another example, as shown in FIG. 8, it may be learned that a resource subset 1 and a resource subset 2 are consecutive in frequency domain, but there is no overlapping area between them. That is, at a connected part between the resource subset 1 and the resource subset 2, there are consecutive control channel bearing resource units in frequency domain. In this case, the network device may select any control channel bearing resource unit in the resource subset 1, and then select one control channel bearing resource unit in the resource subset 2, where the control channel bearing resource unit selected in the resource subset 2 and the control channel bearing resource unit selected in the resource subset 1 are inconsecutive in frequency domain. The control channel bearing resource unit selected in the resource subset 2 and the control channel bearing resource unit selected in the resource subset 1 are both determined as resources that carry the downlink control information, thereby ensuring that the control channel bearing resource units that carry the downlink control information are inconsecutive in frequency domain.

Figure 9:
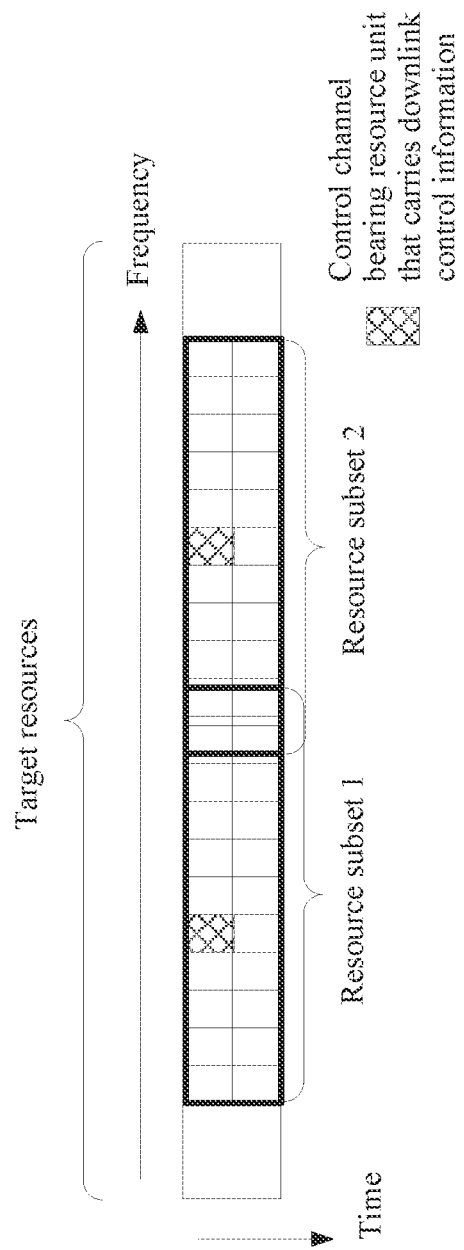
FIG. 9 is still another schematic diagram of a distribution status of control channel bearing resource units that carry downlink control information according to this disclosure.

For still another example, as shown in FIG. 9, it may be learned that there is an overlapping area in frequency domain between a resource subset 1 and a resource subset 2, but the resource subset 1 and the resource subset 2 do not completely overlap each other. That is, in the overlapping area between the resource subset 1 and the resource subset 2, there are control channel bearing resource units consecutive in frequency domain. In this case, the network device may determine, in a non-overlapping area in the resource subset 1 and a non-overlapping area in the resource subset 2, at least one control channel bearing resource unit in the non-overlapping area in the resource subset 1 and at least one control channel bearing resource unit in the non-overlapping area in the resource subset 2 as resources that carry the downlink control information, thereby ensuring that the control channel bearing resource units that carry the downlink control information are inconsecutive in frequency domain.

It should be understood that this disclosure describes a type of the frequency domain element merely by using an example in which one frequency domain element is one of the foregoing several resources, but this disclosure is not limited thereto, and the frequency domain element may be another type of resource.

Optionally, a mapping relationship is determined. The mapping relationship indicates a correspondence between at least one piece of downlink control information that includes first downlink control information and at least one resource set that includes a first resource set. According to the mapping relationship, a resource set corresponding to the first downlink control information is determined as the first resource set that carries the first downlink control information.

Specifically, the network device may determine the mapping relationship, where the mapping relationship may be determined based on a protocol specification, or may be preconfigured for the network device by using a system. The mapping relationship indicates the correspondence between at least one piece of downlink control information that includes the first downlink control information and at least one resource set that includes the first resource set. When sending the first downlink control information to the terminal device, the network device may determine, according to the mapping relationship, the resource set corresponding to the first downlink control information in the mapping relationship as the first resource set that carries the first downlink control information.

For example, the mapping relationship may be a mapping relationship table, and through table lookup, the network device may determine the first resource set corresponding to the first downlink control information.

For another example, the mapping relationship may alternatively be a mapping formula, and the network device may perform calculation based on the mapping formula to determine the first resource set corresponding to the first downlink control information.

It should be understood that this disclosure merely uses two examples by using the resource mapping relationship to describe a manner of determining the resource set, but this disclosure is not limited thereto. Alternatively, the resource set may be determined in another manner, and this is not limited in this disclosure.

S230. Send the first downlink control information to the terminal device on the first resource set.

Specifically, after determining the N control channel bearing resource units that carry the first downlink control information, the network device sends the downlink control information to the terminal device by using the N control channel bearing resource units, that is, sending the downlink control information to the terminal device by using the first resource set. Specifically, each of the N control channel bearing resource units carries only a part of the downlink control information to be sent, and the network device finally sends the downlink control information to the terminal device by using the N control channel bearing resource units.

Optionally, the target resources are divided into at least one time domain element in time domain, and one control channel bearing resource unit includes part of or all of the at least one time domain element.

Figure 10:
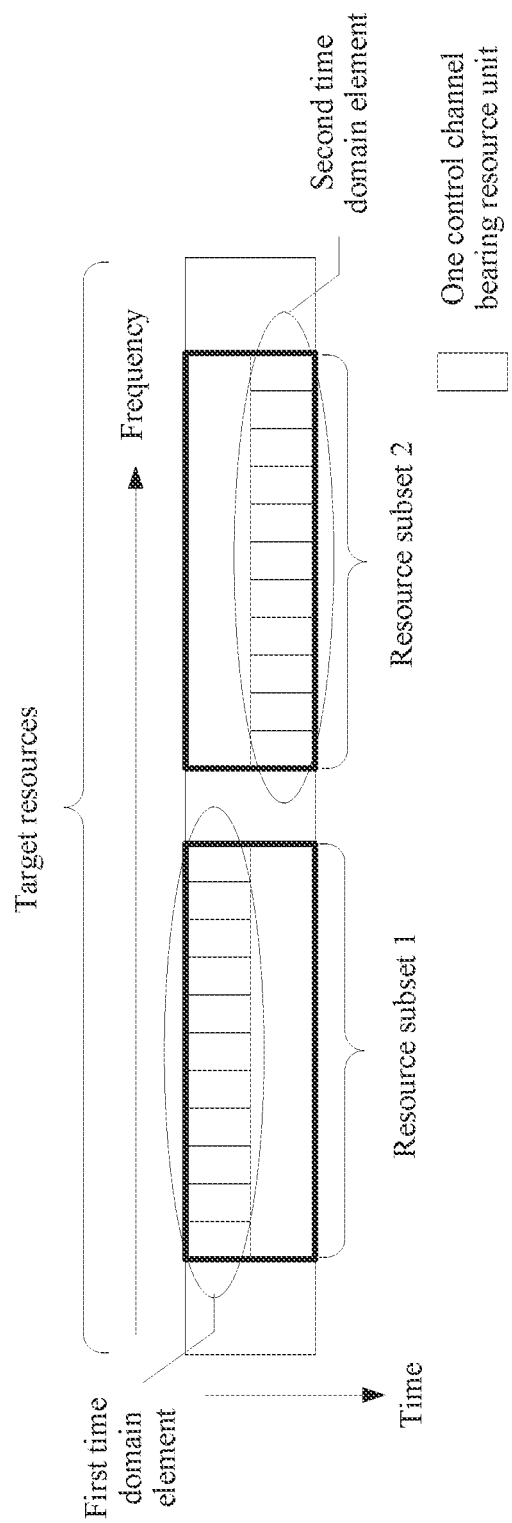
FIG. 10 is a schematic diagram of a distribution status of resource subsets in time domain resources of target resources according to this disclosure.

Specifically, the network device divides the target resources into at least one time domain element, and one control channel bearing resource unit may include all time domain elements of the target resources, or may include only some time domain elements of the target resources. For example, as shown in FIG. 10, a resource subset 1 and a resource subset 2 include only some time domain elements of the target resources. It may be learned from FIG. 10 that the resource subset 1 includes only the first time domain element of the target resources, and the resource subset 2 includes only the second time domain element of the target resources.

It should be understood that this disclosure merely uses an example to describe a distribution status of a control channel bearing resource unit in the time domain element of the target resources, but this disclosure is not limited thereto.

Optionally, a frequency domain bandwidth occupied by the M resource subsets is less than or equal to a bandwidth of the target resources.

Specifically, the network device divides the target resources into the M resource subsets, and the frequency domain bandwidth occupied by the M resource subsets is less than or equal to the bandwidth of the target resources. Therefore, the terminal device uses a narrower frequency domain bandwidth to receive the downlink control information, thereby reducing power consumption of the terminal device.

S240. Receive, on the first resource set, the first downlink control information sent by the network device.

Optionally, the first resource set is determined in the M resource subsets, where the first resource set includes N control channel bearing resource units. At least two of the N control channel bearing resource units belong to different resource subsets, and at least two of the N control channel bearing resource units are inconsecutive in frequency domain, where $N \geq 2$.

Optionally, a mapping relationship is determined. The mapping relationship indicates a correspondence between at least one piece of downlink control information that includes the first downlink control information and at least one resource set that includes the first resource set. Determining the first resource set in the M resource subsets includes: determining, according to the mapping relationship, a resource set corresponding to the first downlink control information as the first resource set.

Specifically, the terminal device first determines the first resource set that carries the first downlink control information. The terminal device may determine the mapping relationship, where the mapping relationship may be determined based on a protocol specification, or may be preconfigured for the terminal device by using a system, or may be sent to the terminal device by the network device. This is not limited in this disclosure.

The mapping relationship indicates the correspondence between at least one piece of downlink control information that includes the first downlink control information and at least one resource set that includes the first resource set. When receiving the first downlink control information sent by the network device, the terminal device may determine, according to the mapping relationship, the resource set corresponding to the first downlink control information in the mapping relationship as the first resource set that carries the first downlink control information, and may receive, by using the first resource set, the first downlink control information sent by the network device.

For example, the mapping relationship may be a mapping relationship table, and through table lookup, the network device may determine the first resource set corresponding to the first downlink control information.

For another example, the mapping relationship may alternatively be a mapping formula, and the network device may perform calculation based on the mapping formula to determine the first resource set corresponding to the first downlink control information.

It should be understood that this disclosure merely uses two examples by using the resource mapping relationship to describe a manner of determining the resource set, but this disclosure is not limited thereto. Alternatively, the resource set may be determined in another manner, and this is not limited in this disclosure.

Therefore, in the uplink control information transmission method in this disclosure, the target resources are divided into the M resource subsets, and the N control channel bearing resource units inconsecutive in frequency domain are determined by using the M resource subsets, so that the downlink control information is sent on the N inconsecutive control channel bearing resource units, thereby ensuring a frequency diversity gain.

Figure 11:
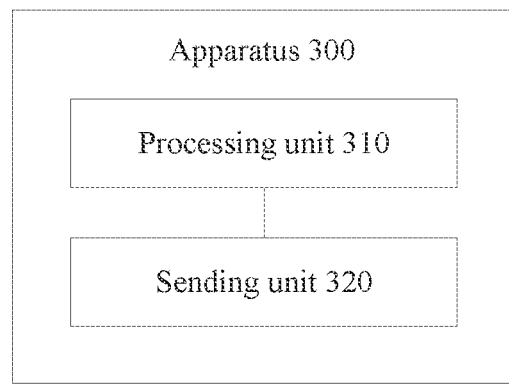
FIG. 11 is a schematic block diagram of a downlink control information transmission apparatus according to this disclosure.

FIG. 11 is a schematic block diagram of a downlink control information transmission apparatus 300 according to this disclosure. As shown in FIG. 11, the apparatus 300 includes a processing unit 310 and a sending unit 320.

The processing unit 310 is configured to divide target resources into M resource subsets, where at least a part of at least two resource subsets in the M resource subsets do not overlap in frequency domain, and each resource subset includes at least one control channel bearing resource unit, where M is an integer, and $M \geq 2$.

The processing unit 310 is further configured to determine a first resource set based on the M resource subsets. The first resource set includes N control channel bearing resource units, at least two of the N control channel bearing resource units belong to different resource subsets, and at least two of the N control channel bearing resource units are inconsecutive in frequency domain, where $N \geq 2$.

The sending unit 320 is configured to send first downlink control information to a terminal device on the first resource set.

Optionally, the processing unit 310 is further configured to:

determine a mapping relationship, where the mapping relationship indicates a correspondence between at least one piece of downlink control information that includes the first downlink control information and at least one resource set that includes the first resource set; and the processing unit 310 is further configured to:

determine, according to the mapping relationship, a resource set corresponding to the first downlink control information as the first resource set.

Optionally, the target resources are divided into a plurality of frequency domain elements in frequency domain, and one control channel bearing resource unit includes at least two consecutive frequency domain elements.

Optionally, the target resources are divided into at least one time domain element in time domain, and one control channel bearing resource unit includes part of or all of the at least one time domain element.

Optionally, a frequency domain bandwidth occupied by the M resource subsets is less than or equal to a bandwidth of the target resources.

It should be understood that the downlink control information transmission apparatus 300 according to this disclosure may correspond to the network device in the method in this disclosure, and each unit and module as well as the foregoing another operation and/or function of the downlink control information transmission apparatus 300 are separately intended to implement the corresponding procedure in the method 200 performed by the network device. For brevity, details are not described herein.

Therefore, the uplink control information transmission apparatus in this disclosure divides the target resources into the M resource subsets, and determines the N control channel bearing resource units inconsecutive in frequency domain by using the M resource subsets, so as to send the downlink control information on the N inconsecutive control channel bearing resource units, thereby ensuring a frequency diversity gain.

Figure 12:
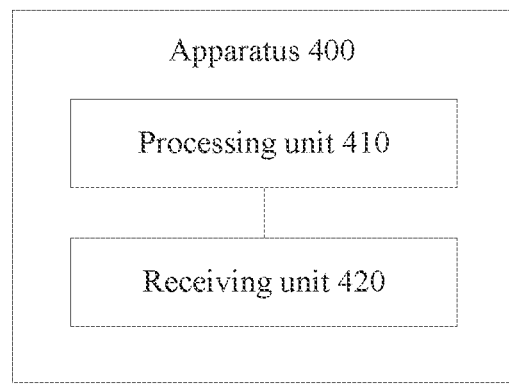
FIG. 12 is a schematic block diagram of a downlink control information transmission apparatus according to this disclosure.

FIG. 12 is a schematic block diagram of a downlink control information transmission apparatus 400 according to this disclosure. As shown in FIG. 12, the apparatus 400 includes a processing unit 410 and a receiving unit 420.

The processing unit 410 is configured to determine a first resource set based on M resource subsets. The first resource set includes N control channel bearing resource units, where M is an integer, and M≥2. At least two of the N control channel bearing resource units belong to different resource subsets, and at least two of the N control channel bearing resource units are inconsecutive in frequency domain, where N≥2.

The receiving unit 420 is configured to receive, on the first resource set, first downlink control information sent by a network device.

Optionally, the processing unit 410 is further configured to:
determine a mapping relationship, where the mapping relationship indicates a correspondence between at least one piece of downlink control information that includes the first downlink control information and at least one resource set that includes the first resource set; and
the processing unit 410 is further configured to determine, according to the mapping relationship, a resource set corresponding to the first downlink control information as the first resource set.

Optionally, target resources are divided into a plurality of frequency domain elements in frequency domain, and one control channel bearing resource unit includes at least two consecutive frequency domain elements.

Optionally, the target resources are divided into at least one time domain element in time domain, and one control channel bearing resource unit includes part of or all of the at least one time domain element.

Optionally, a frequency domain bandwidth occupied by the M resource subsets is less than or equal to a bandwidth of the target resources.

It should be understood that the downlink control information transmission apparatus 400 according to this disclosure may correspond to the terminal device in the method in this disclosure, and each unit and module as well as the foregoing another operation and/or function of the downlink control information transmission apparatus 400 are separately intended to implement the corresponding procedure in the method 200 performed by the terminal device. For brevity, details are not described herein.

Therefore, the uplink control information transmission apparatus in this disclosure divides the target resources into the M resource subsets, and determines the N control channel bearing resource units inconsecutive in frequency domain by using the M resource subsets, so as to send the downlink control information on the N inconsecutive control channel bearing resource units, thereby ensuring a frequency diversity gain.

Figure 13:
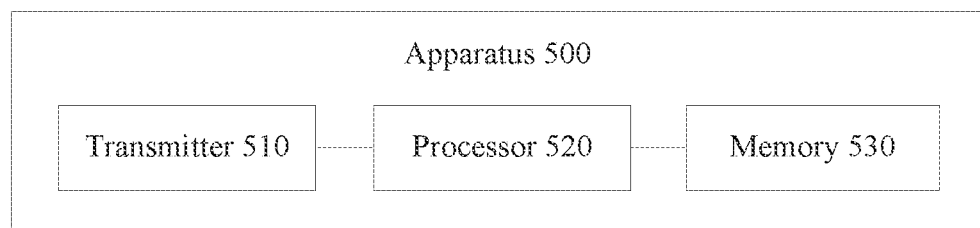
FIG. 13 is a schematic structural diagram of a downlink control information transmission apparatus according to this disclosure.

FIG. 13 is a schematic structural diagram of a downlink control information transmission apparatus 500 according to this disclosure. The apparatus 500 includes:
a transmitter 510;
a processor 520; and
a memory 530.

The memory 530 is configured to store an instruction, and the processor 520 is configured to execute the instruction stored in the memory 530, so as to control the transmitter 510 to send a signal.

The processor 520 is configured to divide target resources into M resource subsets, where at least a part of at least two resource subsets in the M resource subsets do not overlap in frequency domain, and each resource subset includes at least one control channel bearing resource unit, where M is an integer, and M≥2.

The processor 520 is further configured to determine a first resource set based on the M resource subsets, where the first resource set includes N control channel bearing resource units, at least two of the N control channel bearing resource units belong to different resource subsets, and at least two of the N control channel bearing resource units are inconsecutive in frequency domain, where N≥2.

The transmitter 510 is configured to send first downlink control information to a terminal device on the first resource set.

Optionally, the processor 520 is further configured to:
determine a mapping relationship, where the mapping relationship indicates a correspondence between at least one piece of downlink control information that includes the first downlink control information and at least one resource set that includes the first resource set; and
the processor 520 is further configured to:
determine, according to the mapping relationship, a resource set corresponding to the first downlink control information as the first resource set.

Optionally, the target resources are divided into a plurality of frequency domain elements in frequency domain, and one control channel bearing resource unit includes at least two consecutive frequency domain elements.

Optionally, the target resources are divided into at least one time domain element in time domain, and one control channel bearing resource unit includes part of or all of the at least one time domain element.

Optionally, a frequency domain bandwidth occupied by the M resource subsets is less than or equal to a bandwidth of the target resources.

It should be understood that in this disclosure, the processor 520 may be a central processing unit (CPU), or the processor 520 may be another general-purpose processor, a digital signal processor (DSP), an disclosure-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 530 may include a read-only memory and a random access memory, and provide an instruction and data to the processor 520. A part of the memory 530 may further include a non-volatile random access memory. For example, the memory 530 may further store information about a device type.

In an implementation process, steps in the foregoing methods can be implemented by using a hardware integrated logical circuit in the processor 520, or by using instructions in a form of software. The steps of the methods disclosed with reference to this disclosure may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 530, and the processor 520 reads information in the memory 530 and completes the steps in the foregoing methods in combination with hardware of the processor. To avoid repetition, details are not described herein again.

It should be understood that the downlink control information transmission apparatus 500 according to this disclosure may correspond to the network device in the method in this disclosure, and each unit and module as well as the foregoing another operation and/or function of the downlink control information transmission apparatus 500 are separately intended to implement the corresponding procedure in the method 200 performed by the network device. For brevity, details are not described herein.

Therefore, the uplink control information transmission apparatus in this disclosure divides the target resources into the M resource subsets, and determines the N control channel bearing resource units inconsecutive in frequency domain by using the M resource subsets, so as to send the downlink control information on the N inconsecutive control channel bearing resource units, thereby ensuring a frequency diversity gain.

Figure 14:
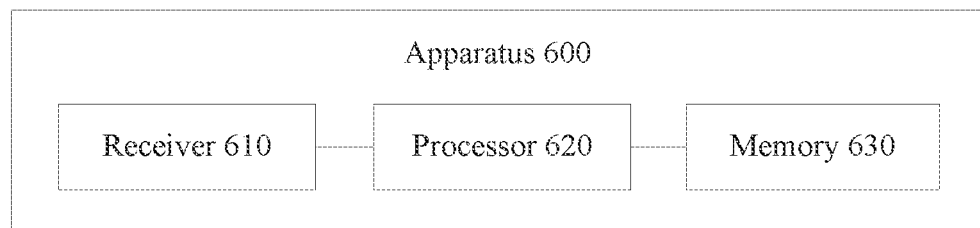
FIG. 14 is a schematic structural diagram of a downlink control information transmission apparatus according to this disclosure.

FIG. 14 is a schematic structural diagram of a downlink control information transmission apparatus 600 according to this disclosure. The apparatus 600 includes:
a receiver 610;
a processor 620; and
a memory 630.

The memory 630 is configured to store an instruction, and the processor 620 is configured to execute the instruction stored in the memory 630, so as to control the receiver 610 to receive a signal.

The processor 620 is configured to determine a first resource set based on M resource subsets. The first resource set includes N control channel bearing resource units, where M is an integer, and M≥2. At least two of the N control channel bearing resource units belong to different resource subsets, and at least two of the N control channel bearing resource units are inconsecutive in frequency domain, where N≥2.

The receiver 610 is configured to receive, on the first resource set, first downlink control information sent by a network device.

Optionally, the processor 620 is further configured to determine a mapping relationship, where the mapping relationship indicates a correspondence between at least one piece of downlink control information that includes the first downlink control information and at least one resource set that includes the first resource set; and the processor 620 is further configured to determine, according to the mapping relationship, a resource set corresponding to the first downlink control information as the first resource set.

Optionally, target resources are divided into a plurality of frequency domain elements in frequency domain, and one control channel bearing resource unit includes at least two consecutive frequency domain elements.

Optionally, the target resources are divided into at least one time domain element in time domain, and one control channel bearing resource unit includes part of or all of the at least one time domain element.

Optionally, a frequency domain bandwidth occupied by the M resource subsets is less than or equal to a bandwidth of the target resources.

It should be understood that in this disclosure, the processor 620 may be a central processing unit (CPU), or the processor 620 may be another general-purpose processor, a digital signal processor (DSP), an disclosure-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

The memory 630 may include a read-only memory and a random access memory, and provide an instruction and data to the processor 620. A part of the memory 630 may further include a non-volatile random access memory. For example, the memory 630 may further store information about a device type.

In an implementation process, steps in the foregoing methods can be implemented by using a hardware integrated logical circuit in the processor 620, or by using instructions in a form of software. The steps of the methods disclosed with reference to this disclosure may be directly implemented by a hardware processor, or may be implemented by a combination of hardware and a software module in a processor. The software module may be located in a mature storage medium in the art, such as a random access memory, a flash memory, a read-only memory, a programmable read-only memory, an electrically erasable programmable memory, or a register. The storage medium is located in the memory 630, and the processor 620 reads information in the memory 630 and completes the steps in the foregoing methods in combination with hardware of the processor. To avoid repetition, details are not described herein again.

It should be understood that the downlink control information transmission apparatus 600 according to this disclosure may correspond to the terminal device in the method in this disclosure, and each unit and module as well as the foregoing another operation and/or function of the downlink control information transmission apparatus 600 are separately intended to implement the corresponding procedure in the method 200 performed by the terminal device. For brevity, details are not described herein.

Therefore, the uplink control information transmission apparatus in this disclosure divides the target resources into the M resource subsets, and determines the N control channel bearing resource units inconsecutive in frequency domain by using the M resource subsets, so as to send the downlink control information on the N inconsecutive control channel bearing resource units, thereby ensuring a frequency diversity gain.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular disclosures and design constraints of the technical solutions. A person skilled in the art may use different methods to implement the described functions for each particular disclosure, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method comprising:
   dividing, by a terminal device, target resources into a plurality of resource subsets, wherein the target recourses occupy at least one time domain element, wherein at least two of the plurality of resource subsets do not overlap in a frequency domain, and wherein each of the plurality of resource subsets comprises at least one control channel bearing resource unit;
   determining, by the terminal device, a resource set from the plurality of resource subsets, wherein the resource set consists of a plurality of control channel bearing resource units that are not consecutive in the frequency domain, wherein each of the plurality of control channel bearing resource units belongs to a different one of the plurality of resource subsets and occupies all of the at least one time domain element occupied by the target resources, wherein each of the plurality of control channel bearing resource units includes at least two resource element groups (REGs) that are consecutive in the frequency domain, and wherein each REG of the at least two REGs comprises a plurality of resource elements (REs); and
   receiving, by the terminal device, downlink control information on the resource set.

2. The method according to claim 1, wherein a frequency domain bandwidth of the plurality of resource subsets is less than or equal to a bandwidth of the target resources.

3. The method according to claim 1, wherein determining the resource set comprises:
   determining, by the terminal device based on a mapping relationship, the resource set corresponding to the downlink control information.

4. The method according to claim 1, wherein the REs of the at least two REGs in each control channel bearing resource unit are consecutive in the frequency domain.

5. The method according to claim 1, wherein the plurality of control channel bearing resource units carry reference signals for demodulating the downlink control information.

6. The method according to claim 1, wherein subcarriers of the REG are consecutive.

7. A method comprising:
   dividing, by a network device, target resources into a plurality of resource subsets, wherein the target recourses occupy at least one time domain element, wherein at least two of the plurality of resource subsets do not overlap in a frequency domain, and wherein each of the plurality of resource subsets comprises at least one control channel bearing resource unit;
   determining, by the network device, a resource set from the plurality of resource subsets, wherein the resource set consists of a plurality of control channel bearing resource units that are not consecutive in the frequency domain, wherein each of the plurality of control channel bearing resource units belongs to a different one of the plurality of resource subsets and occupies all of the at least one time domain element occupied by the target resources, wherein each of the plurality of control channel bearing resource units includes at least two resource element groups (REGs) that are consecutive in the frequency domain, and wherein each REG of the at least two REGs comprises a plurality of resource elements (REs); and sending, by the network device, downlink control information on the resource set.

8. The method according to claim 7, wherein a frequency domain bandwidth of the plurality of resource subsets is less than or equal to a bandwidth of the target resources.

9. The method according to claim 7, wherein determining the resource set comprises:
determining, by the network device based on a mapping relationship, the resource set corresponding to the downlink control information.

10. The method according to claim 7, wherein the REs of the at least two REGs in each control channel bearing resource unit are consecutive in thefrequency domain.

11. The method according to claim 7, wherein the plurality of control channel bearing resource units carry reference signals for demodulating the downlink control information.

12. The method according to claim 7, wherein subcarriers of the REG are consecutive.

13. An apparatus comprising:
at least one processor; and
a memory coupled to the at least one processor storing programming instructions for execution by the at least one processor to cause the apparatus to:
divide target resources into a plurality of resource subsets, wherein the target recourses occupy at least one time domain element, wherein at least two of the plurality of resource subsets do not overlap in a frequency domain, and wherein each of the plurality of resource subsets comprises at least one control channel bearing resource unit;
determine a resource set from the plurality of resource subsets, wherein the resource set consists of a plurality of control channel bearing resource units that are not consecutive in the frequency domain, at least two of wherein each of the plurality of control channel bearing resource units belongs to a different one of the plurality of resource subsets and occupies all of the at least one time domain element occupied by the target resources, wherein each of the plurality of control channel bearing resource units includes at least two resource element groups (REGs) that are consecutive in the frequency domain, and wherein each REG of the at least two REGs comprises a plurality of resource elements (REs); and
receive downlink control information on the resource set.

14. The apparatus according to claim 13, wherein a frequency domain bandwidth of plurality of M resource subsets is less than or equal to a bandwidth of the target resources.

15. The apparatus according to claim 13, wherein the programming instructions further cause the apparatus to:
determine based on a mapping relationship, the resource set corresponding to the downlink control information.

16. The apparatus according to claim 13, wherein the REs of the at least two REGs in each control channel bearing resource unit are consecutive in the frequency domain.

17. The apparatus according to claim 13, wherein the plurality of control channel bearing resource units carry reference signals for demodulating the downlink control information.

18. The apparatus according to claim 13, wherein subcarriers of the REG are consecutive.

19. An apparatus comprising:
at least one processor; and
a memory coupled to the at least one processor storing programming instructions for execution by the at least one processor to cause the apparatus to:
divide target resources into a plurality of resource subsets, wherein the target recourses occupy at least one time domain element, wherein at least two of the plurality of resource subsets do not overlap in a frequency domain, and wherein each of the plurality of resource subsets comprises at least one control channel bearing resource unit;
determine a resource set from the plurality of resource subsets, wherein the resource set consists of a plurality of control channel bearing resource units that are not consecutive in the frequency domain, wherein each of the plurality of control channel bearing resource units belongs to a different one of the plurality of resource subsets and occupies all of the at least one time domain element occupied by the target resources, wherein each of the plurality of control channel bearing resource units includes at least two resource element groups (REGs) that are consecutive in the frequency domain, and wherein each REG of the at least two REGs comprises a plurality of resource elements (REs); and
send downlink control information on the resource set.

20. The apparatus according to claim 19, wherein a frequency domain bandwidth of the plurality of resource subsets is less than or equal to a bandwidth of the target resources.

21. The apparatus according to claim 19, wherein the programming instructions further cause the apparatus to:
determine based on a mapping relationship, the resource set corresponding to the downlink control information.

22. The apparatus according to claim 19, wherein the REs of the at least two REGs in each control channel bearing resource unit are consecutive in the frequency domain.

23. The apparatus according to claim 19, wherein the plurality of control channel bearing resource units carry reference signals for demodulating the downlink control information.

24. The apparatus according to claim 19, wherein subcarriers of the REG are consecutive.

* * * * *

UNITED STATES PATENT AND TRADEMARK OFFICE
CERTIFICATE OF CORRECTION

PATENT NO. : 11,671,985 B2
APPLICATION NO. : 17/387175
DATED : June 6, 2023
INVENTOR(S) : Shulan Feng and Lixia Xue Page 1 of 1

It is certified that error appears in the above-identified patent and that said Letters Patent is hereby corrected as shown below:

In the Claims

Column 18 Line 9 - Claim 1, delete "recourses" and insert -- resources --.

Column 18 Line 49 - Claim 7, delete "recourses" and insert -- resources --.

Column 19 Line 13 - Claim 10, delete "thefrequency" and insert -- the frequency --.

Column 19 Line 26 - Claim 13, delete "recourses" and insert -- resources --.

Column 19 Line 35-36 - Claim 13, after "domain," delete "at least two of".

Column 20 Line 15 - Claim 19, delete "recourses" and insert -- resources --.

Signed and Sealed this
Fifth Day of September, 2023

Katherine Kelly Vidal
*Director of the United States Patent and Trademark Office*